US005803962A

United States Patent [19]

Kobayashi et al.

[11] Patent Number: 5,803,962

[45] Date of Patent: Sep. 8, 1998

[54] DISAZO PIGMENT COMPOSITION AND PRINTING INK

[75] Inventors: Nagatoshi Kobayashi, Kashima-gun; Sadayuki Tomioka, Kashima; Shigeto Aoki, Kashima-gun; Hirohito Ando, Namekata-gun, all of Japan

[73] Assignee: Dainippon Ink and Chemicals, Inc., Tokyo, Japan

[21] Appl. No.: 908,463

[22] Filed: Aug. 7, 1997

[30] Foreign Application Priority Data

Aug. 8, 1996 [JP] Japan .................................... 8-209794

[51] Int. Cl.[6] .................................................... C09B 27/00

[52] U.S. Cl. .................... 106/496; 106/31.8; 106/31.81; 106/494

[58] Field of Search .................................... 106/494, 496, 106/31.8, 31.81

[56] References Cited

U.S. PATENT DOCUMENTS

| | | | |
|---|---|---|---|
| Re. 35,654 | 11/1997 | Platman et al. | 106/496 |
| 2,849,329 | 8/1958 | Braun | 106/496 |
| 3,759,731 | 9/1973 | Kühne et al. | 8/641 |
| 4,035,350 | 7/1977 | Landler et al. | 106/496 |
| 4,665,163 | 5/1987 | Hunger et al. | 534/746 |
| 4,894,094 | 1/1990 | Ruff et al. | 106/496 |
| 4,981,489 | 1/1991 | Ruff et al. | 8/641 |
| 5,352,281 | 10/1994 | Weide et al. | 106/496 |
| 5,382,288 | 1/1995 | Schenk et al. | 106/496 |

FOREIGN PATENT DOCUMENTS

| | | |
|---|---|---|
| 45-11026 | 4/1970 | Japan . |
| 55-89356 | 7/1980 | Japan . |
| 59-19150 | 5/1984 | Japan . |
| 62-197460 | 9/1987 | Japan . |
| 63-178169 | 7/1988 | Japan . |

*Primary Examiner*—Mark L. Bell
*Assistant Examiner*—Scott L. Hertzog
*Attorney, Agent, or Firm*—Armstrong, Westerman, Hattori, McLeland & Naughton

[57] ABSTRACT

A disazo pigment composition, capable of being used to form inks or coatings having both high flow ability and high viscosity, containing (a) a disazo pigment, (b) an asymmetrical disazo compound having a water-soluble group and (c) an asymmetrical disazo compound, which has a substituent group possessing a hydrogen-bonding property.

16 Claims, No Drawings

DISAZO PIGMENT COMPOSITION AND PRINTING INK

BACKGROUND OF THE INVENTION

1. Field of the Invention

The present invention relates to a disazo pigment composition, more specifically to a disazo pigment composition capable of producing an ink and coating with exceptional flow ability and viscosity, and a printing ink containing this disazo pigment composition.

2. Description of Related Art

As examples of conventional methods for improving the flow ability and transparency of printing inks and coatings containing disazo pigments, Japanese Patent Application, Second Publication No. Sho 45-11026 teaches a method for mixing sulfonic acid components into disazo pigments, U.S. Pat. No. 3,759,731 teaches a method of using disazo pigments formed by using a mixture of non-polar coupling components and polar coupling components having carboxylic acid groups and/or sulfonic acid groups as coupling components, and U.S. Pat. No. 4,894,094, U.S. Pat. No. 4981489 and Japanese Patent Application, First Publication No. Sho 63-178169 teach a method of using asymmetric disazo pigment compositions formed from polar coupling components and non-polar coupling components.

U.S. Pat. No. 4,894,094, U.S. Pat. No. 4,981,489 and Japanese Patent Application, First Publication No. 63-178169 disclose methods for selectively producing asymmetric disazo pigments. In earlier disazo pigment producing methods, as disclosed in U.S. Pat. No. 3,759,731, a mixture of common symmetric disazo pigments and symmetric disazo pigments of acetoacetanilides having carboxylic acid groups and/or sulfonic acid groups was produced.

Additionally, as methods for improving the heat stability (transparency) or color strength, there are methods of producing disazo pigments by mixing coupling components, which have substituent groups possessing a hydrogen-bonding property, with common coupling components. For example, Japanese Patent Application, Second Publication No. Sho 59-19150 teaches a method of producing disazo pigments by mixing coupling components having carboxylic acid amide groups into common coupling components, Japanese Patent Application, First Publication No. Sho 55-89356 teaches a method of producing disazo pigments by mixing coupling components having acetylamino groups into common coupling components, U.S. Pat. No. 4,665,163 teaches a method of producing disazo pigments by mixing coupling components having benzimidazolone groups into common coupling components, and Japanese Patent Application, First Publication No. Sho 62-197460 teaches a method of producing disazo pigments by mixing coupling components having sulfonamide groups into common coupling components. However, the compositions of the disazo pigments due to these production methods are believed to be mixed crystals (Japanese Patent Application, Second Publication No. Sho 59-19150) or mixtures of symmetric disazo pigments of acetoacetanilides, which have substituent groups possessing a hydrogen-bonding property, and common symmetric disazo pigments, and the methods for producing asymmetric disazo compounds and their effects have not been conventionally known.

The flow ability, heat stability and color strength of inks and coatings have been independently resolved in the conventional art. In particular, while the flow ability of inks and coatings have been markedly improved along with the recent trends toward higher speed printing and coating, the improvements in flow ability have also resulted in decreases in the viscosity of inks and coatings. Decreases in viscosity can result in various problems. For example, if the viscosity of oil-based inks decreases, the dot gain increases, the definition of printed articles is degraded, and an ink flying phenomenon known as misting occurs upon printing. Additionally, with liquid inks, there is a problem in that bleeding and mottling occur as a result of permeation and diffusion of the ink. Furthermore, in coatings, it is difficult to retain an appropriate film thickness, and sagging tends to occur upon coating.

Thus, disazo pigments capable of achieving a high viscosity while maintaining high flow ability have heretofore been unknown.

SUMMARY OF THE INVENTION

The present invention has the object of offering a disazo pigment which has both high flow ability and high viscosity when used in inks or coatings, and a printing ink which has both high flow ability and high viscosity.

The present inventors conducted diligent research for the purposes of developing a disazo pigment having both high flow ability and high viscosity, as a result of which they discovered that a disazo pigment composition obtained by mixing two types of asymmetric disazo compounds expressed by the below-given general formulas (I) and (II) into a disazo pigment, and a printing ink containing this disazo pigment composition has these properties, thereby accomplishing the present invention.

That is, the present invention offers a disazo pigment composition containing: (a) a disazo pigment; (b) a disazo compound expressed by the following Formula (I):

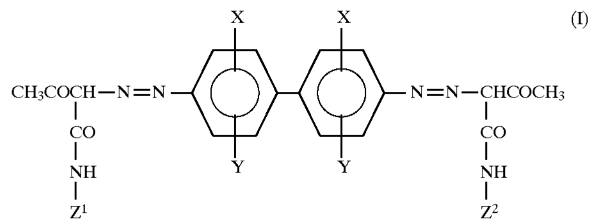

(I)

wherein X and Y each independently denote a hydrogen atom, a halogen atom, an alkyl group with 1–4 carbon atoms, an alkoxyl group with 1–4 carbon atoms or an alkoxycarbonyl group having an alkoxyl group with 1–4 carbon atoms, provided that X and Y never simultaneously denote hydrogen atoms, $Z^1$ denotes a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups, and $Z^2$ denotes a phenyl group or naphthyl group which may have 1–4 identical or different substituent groups selected from the group consisting of lower alkyl groups, lower alkoxyl groups, halogen atoms, hydroxyl groups and lower alkoxycarbonyl groups, and having a carboxylic acid group and/or a sulfonic acid group which may be a salt of a metal of at least one type selected from the group consisting of alkali earth metals, aluminum, magnesium and zinc; and (c) a disazo compound expressed by the following Formula (II):

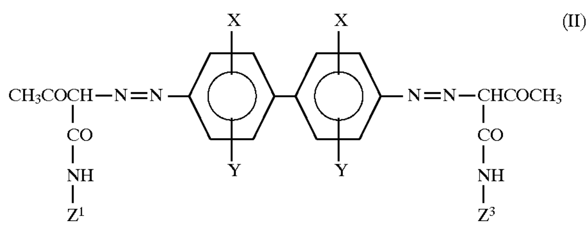

wherein X and Y each independently denote a hydrogen atom, a halogen atom, an alkyl group with 1–4 carbon atoms, an alkoxyl group with 1–4 carbon atoms or an alkoxycarbonyl group having an alkoxyl group with 1–4 carbon atoms, provided that X and Y never simultaneously denote hydrogen atoms, $Z^1$ denotes a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups, and $Z^3$ denotes a benzimidazolone residue, a phthalimide residue, or a phenyl group or naphthyl group which may have 1–4 identical or different substituent groups selected from the group consisting of lower alkyl groups, lower alkoxyl groups, halogen atoms, hydroxyl groups and lower alkoxycarbonyl, and having 1–4 substituent groups selected from the group consisting of carboxylic amide groups, sulfonic amide groups and acetamido groups.

The present invention also offers a printing ink containing the disazo pigment composition described above.

The disazo pigment composition of the present invention is capable of offering a lithographic ink having high flow ability so as to be able to handle high speed printing, and having high viscosity so as not to increase the dot gain, degrade the definition of printed articles or cause an ink flying phenomenon known as misting when printing.

DESCRIPTION OF THE PREFERRED EMBODIMENTS

The disazo compound expressed by the general formula (I) used in the present invention is capable of being produced, for example, according to the following production method.

That is, a method of producing the disazo compound expressed by general formula (I) produced by reacting a tetrazo compound formed by inducing a tetrazo reaction by a conventional method on the aromatic diamine expressed by the following general formula (III):

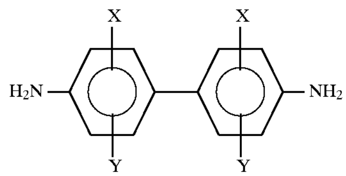

(wherein X and Y each independently represent a hydrogen atom, a halogen atom, an alkyl group having 1–4 carbon atoms, an alkoxyl group having 1–4 carbon atoms or an alkoxycarbonyl group having an alkoxyl group having 1–4 carbon atoms; with the exception that X and Y never simultaneously represent hydrogen atoms) with an acetoacetamide compound (hereinafter referred to as coupling component A2) expressed by the following general formula (IV):

$$CH_3COCH_2CONH—Z^2 \qquad (IV)$$

(wherein $Z^2$ represents a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups; the phenyl groups or naphthyl groups having 1–4 carboxylic acid groups and/or sulfonic acid groups; the carboxylic acid groups and/or sulfonic acid groups being capable of being salts of at least one type of metal selected from the group consisting of alkali earth metals, aluminum, magnesium and zinc), then inducing a reaction between this reaction product and the acetoacetamide compound (hereinafter referred to as coupling component A1) expressed by the following general formula (V):

$$CH_3COCH_2CONH—Z^1 \qquad (V)$$

(wherein $Z^1$ represents a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups) to produce the disazo compound expressed by general formula (I).

The disazo compound expressed by the general formula (I) used in the present invention may be such that the carboxylic acid groups and/or sulfonic acid groups thereof are salts of metals selected from the group consisting of alkali earth metals, aluminum, magnesium and zinc.

The above-mentioned metal salts can be water-soluble metal salts of metals selected from the group consisting of alkali earth metals, aluminum, magnesium and zinc, preferably water-soluble metal salts of aluminum, in the form of aqueous solutions if needed, added to a suspension solution of a disazo compound expressed by the general formula (I) to induce a reaction, then the result can be filtered and rinsed. Here, examples of water-soluble metal salts are calcium chloride, strontium chloride, strontium nitrate, barium chloride, aluminum chloride, aluminum sulfate, magnesium chloride and zinc chloride.

Among the disazo compounds expressed by the general formula (I), the disazo compounds should preferably be such that X and Y in the formulas are each independently a hydrogen atom or a chlorine atom (with the exception that X and Y are not both hydrogen atoms), $Z^1$ is a phenyl group which may have 1–2 methyl groups or methoxy groups, $Z^2$ is a phenyl group which may have a hydroxyl group or a chlorine atom, wherein the phenyl group has a carboxylic acid group or a sulfonic acid group. Furthermore, it is especially preferable that X and Y in the formulas are each independently a hydrogen atom or a chlorine atom (with the exception that X and Y are not both hydrogen atoms), $Z^1$ is a phenyl group which may have 1–2 methyl groups or methoxy groups, $Z^2$ is a phenyl group which may have a hydroxyl group and has a carboxylic acid group (or an aluminum salt).

The disazo compound expressed by general formula (II) used in the present invention may, for example, be produced according to the production method described below.

That is, a method of producing the disazo compound expressed by general formula (II) produced by reacting a tetrazo compound formed by inducing a tetrazo reaction by a conventional method on the aromatic diamine expressed by the above-given general formula (III) with an acetoacetamide compound (hereinafter referred to as coupling component A3) expressed by the following general formula (VI):

$$CH_3COCH_2CONH—Z^3 \qquad (VI)$$

(wherein $Z^3$ is a benzimidazolone residue, a phthalimide residue, or a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups; the phenyl groups or naphthyl groups having 1–4 substituent groups selected from the group consisting of carboxylic amides, sulfonic amides and acetamido groups), then inducing a reaction between this reaction product and the acetoacetamide compound (hereinafter referred to as coupling component A1) expressed by the following general formula (V):

$$CH_3COCH_2CONH—Z^1 \qquad (V)$$

(wherein $Z^1$ represents a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups) to produce the disazo compound expressed by general formula (II).

Among the disazo compounds expressed by the general formula (II), the disazo compounds should preferably be such that X and Y in the formulas are each independently a hydrogen atom or a chlorine atom (with the exception that X and Y are not both hydrogen atoms), $Z^1$ is a phenyl group which may have 1–2 methyl groups or methoxy groups, $Z^3$ is a benzimidazolone residue, or a phenyl group having a carbamoyl group, an acetamido group or a sulfamoyl group. Furthermore, it is especially preferable that X and Y in the formulas are each independently a hydrogen atom or a chlorine atom (with the exception that X and Y are not both hydrogen atoms), $Z^1$ is a phenyl group which may have 1–2 methyl groups or methoxy groups, $Z^3$ is a phenyl group having a carbamoyl group, or an acetamido group.

As examples of aromatic diamines expressed by general formula (III), there are 3,3'-dichlorobenzidine, 3,3'-dibromobenzidine, 2,2'-dichlorobenzidine, 3,3'-dimethoxybenzidine, 3,3'-dimethylbenzidine, 3,3',6,6'-tetrachlorobenzidine, 3,3'-dimethoxycarbonylbenzidine, 3,3'-dibutylbenzidine and 3,3'-dibutoxycarbonylbenzidine.

As examples of acetoacetamide compounds expressed by general formula (IV), 2-acetoacetylaminobenzene sulfonic acid, 3-acetoacetylaminobenzene sulfonic acid, 4-acetoacetylaminobenzene sulfonic acid, 2-acetoacetylamino-5-methylbenzene sulfonic acid, 2-acetoacetylamino-4-chloro-5-methylbenzene sulfonic acid, 2-acetoacetylamino-5-chloro-4-methylbenzene sulfonic acid, 4-acetoacetylamino-2,5-dichlorobenzene sulfonic acid, 2-acetoacetylaminonaphthalene sulfonic acid, acetoacetylaminomethane sulfonic acid, acetoacetylaminoethane sulfonic acid, 2-acetoacetylamino benzoic acid, 3-acetoacetylamino benzoic acid, 4-acetoacetylamino benzoic acid, 3-acetoacetylamino-4-chloro benzoic acid, 2-acetoacetylamino-5-bromo benzoic acid, 3-acetoacetylamino-4-methoxy benzoic acid, 2-acetoacetylamino-5-chloro benzoic acid, 2-acetoacetylamino terephthalic acid, 3-acetoacetylamino isophthalic acid, 4-acetoacetylamino-2-hydroxy benzoic acid and 5-acetoacetylamino-2-hydroxy benzoic acid.

As examples of acetoacetamides expressed by the general formula (V), there are acetoacetanilide, acetoacet-o-toluidide, acetoacet-p-toluidide, acetoacet-m-xylidide, acetoacet-o-chloroanilide, acetoacet-p-bromoanilide, acetoacet-o-anisidide, acetoacet-p-anisidide, acetoacet-4-chloro-2,5-dimetoxyanilide, acetoacet-4-ethylanilide and 1-acetoacetylaminonaphthalene.

As examples of acetoacetamide compounds expressed by the general formula (VI), there are 4-acetoacetylamino benzamide, 4-acetoacetylamino benzene sulfonamide, 3-acetoacetylamino-4-chloro benzamide, 3-acetoacetylamino-4-methyl benzamide, 4-acetoacetylamino acetanilide, 5-acetoacetylamino benzimidazolone and 4-acetoacetylamino phthalimide.

As examples of the disazo pigment used in the present invention, there are the disazo pigments expressed by the following general formula (VII):

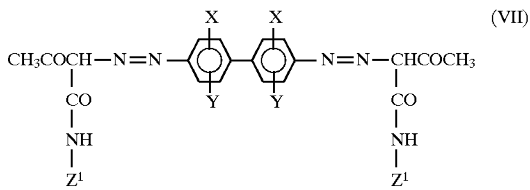

(wherein X and Y each independently represent a hydrogen atom, a halogen atom, an alkyl group having 1–4 carbon atoms, an alkoxyl group having 1–4 carbon atoms or an alkoxycarbonyl group having an alkoxyl group having 1–4 carbon atoms; with the exception that X and Y never simultaneously represent hydrogen atoms; and $Z^1$ represents a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups)

Additionally, examples of the disazo pigment used in the present invention, expressed by C. I. pigment number, are Y-12, Y-13, Y-14, Y-16, Y-17, Y-55, Y-57, Y-81, Y-83, Y113, O-15 and O-16, among which Y-12, Y-13, Y-14, Y-17, Y-55, Y-57 and Y-81 are most preferable.

The disazo pigment composition of the present invention containing a disazo pigment, the disazo compound expressed by general formula (I) and the disazo compound expressed by general formula (II), can be produced by the following methods:

(a) a method of mixing the disazo compound expressed by general formula (I) and the disazo compound expressed by general formula (II) into a disazo pigment synthesized by a conventional method, then extracting as a press cake pigment or a powder pigment;

(b) a method of sequentially mixing in a disazo pigment synthesized by a conventional method, the disazo compound expressed by general formula (I) and the disazo compound expressed by general formula (II) which have been separately stored, when preparing an ink or a coating; or (c) a method of simultaneously synthesizing a disazo pigment, the disazo compound expressed by general formula (I) and the disazo compound expressed by general formula (II).

More specifically, the above-described method (c) is a method of obtaining a disazo pigment composition by mixing a reaction intermediate of the tetrazo compound of aromatic diamine expressed by general formula (III) and coupling component A2 with a reaction intermediate of the tetrazo compound of aromatic diamine expressed by general formula (III) and coupling component A3, and adding the mixture, or adding these reaction intermediates without mixing them, to coupling component A1 to induce a reaction. Alternatively, it is also possible to use a method of mixing together a pigment composition obtained by reacting a reaction intermediate of the tetrazo compound of aromatic diamine expressed by general formula (III) and coupling component A2 with the coupling component A1, and a pigment composition obtained by reacting a reaction intermediate of the tetrazo compound of aromatic diamine expressed by general formula (III) and coupling component A3 with the coupling component A1.

In the above-described method (c), the ratio of use of coupling component A2, coupling component A3 and coupling component A1 must be appropriately selected so that the content of the disazo compound expressed by general formula (I) and the disazo compound expressed by general formula (II) in the solid portion of the disazo pigment composition of the present invention is within the below-described range.

Among the above-mentioned methods (a)–(c), method (c) is especially preferable because it is easily capable of resulting in a disazo pigment composition wherein the disazo compound expressed by general formula (I) and the disazo compound expressed by general formula (II) are finely dispersed in the disazo pigment.

When producing the disazo pigment composition of the present invention, it is preferable that the disazo pigment, the disazo compound expressed by general formula (I) and the disazo compound expressed by general formula (II) have a common skeletal structure, for example, by selecting the disazo pigment expressed by general formula (VII), the disazo compound expressed by general formula (I) and the disazo compound expressed by general formula (II) such that X, Y and $Z^1$ are identical in all of the general formulas, due to the high dispersion effects which can be obtained.

The proportional content of the disazo pigment, the disazo compound expressed by general formula (I) and the disazo compound expressed by general formula (II) in the disazo pigment composition of the present invention is important in order to obtain a disazo pigment composition having both high flow ability and high viscosity. The proportional content of the disazo compound expressed by general formula (I) in the solid portion of the disazo pigment composition of the present invention should preferably be within the range of 0.5–49% by weight, and more preferably in the range of 1–20% by weight when considering the raw material cost. When the proportional content of the disazo compound expressed by general formula (I) in the disazo pigment composition is less than 0.5% by weight, the viscosity of the resulting ink or coating tends to become reduced, while if more than 49% by weight, the flow ability of the resulting ink or coating tends to become reduced. Additionally, the proportional content of the disazo compound expressed by general formula (II) in the solid portion of the disazo pigment composition of the present invention should preferably be within the range of 0.5–49% by weight, and more preferably in the range of 1–20% by weight when considering the raw material cost. When the proportional content of the disazo compound expressed by general formula (II) in the disazo pigment composition is less than 0.5% by weight, the flow ability of the resulting ink or coating tends to become reduced, while if more than 49% by weight, the viscosity of the resulting ink or coating tends to become reduced.

In the solid portion of the disazo pigment composition of the present invention, the total proportional content of the disazo compound expressed by general formula (I) and the disazo compound expressed by general formula (II) should preferably be within the range of 1–49% by weight, and more preferably within the range of 4–35% by weight. Additionally, the weight ratio (I)/(II) of the disazo compound expressed by general formula (I) and the disazo compound expressed by general formula (II) should preferably be within the range of 20/80–80/20, and more preferably within the range of 30/70–75/25.

The disazo pigment composition of the present invention can be kneaded into a printing ink vehicle and used as a printing ink.

Offset ink vehicles are composed, for example, of resins such as rosin phenolic resins, petroleum resins, alkyd resins and dry oil resins thereof, vegetable oils such as linseed oil, tung oil and soybean oil if needed, and solvents such as n-paraffin, isoparaffin, aromatic hydrocarbons solvent, naphthene and α-olefin, of which the proportional mixture in parts by weight should preferably be within the range of resin:vegetable oil:solvent=20–50:0–30:10–60.

The offset ink vehicle containing the disazo pigment composition of the present invention can be formed into a printing ink by suitably blending in commonly known additives such as ink solvents, driers, levelling agents and thickeners as needed.

Additionally, gravure ink vehicles are composed of resin mixtures such as gum rosin, wood rosin, tall oil rosin, coal rosin, lime rosin, rosin ester, maleic acid resin, gilsonite, dammar, shellac, polyamide resin, vinyl resin, nitrocellulose, cyclized rubber, ethyl cellulose, cellulose acetate, ethylene-vinyl acetate copolymer resin, urethane resin, polyester resin and alkyd resin, and solvents such as n-hexane, toluene, ethanol, methanol, acetone, ethyl acetate, ethyl lactate, cellsolve, diacetone alcohol, chlorobenzole, ethyl ether, acetal ethyl ether, ethyl acetoacetate and butyl acetate cellsolve, wherein the mixture proportion in parts by weight should preferably be within the range of resin mixture:solvent=10–50:30–80.

The gravure ink vehicle containing the disazo pigment composition of the present invention can be formed into a printing ink by suitably blending in extender pigments such as barium sulfate, barium carbonate, calcium carbonate, gypsum, alumina white, clay, silica, silica white, talc, calcium silicate and sedimentary magnesium carbonate as needed, as well as plasticizers, anti-UV agents, anti-oxidants and anti-static agents as adjuvants.

EXAMPLES

Hereinbelow, the present invention shall be explained in further detail by means of comparative examples and test examples; however, the present invention should not be construed as being limited by these examples. Additionally, the "parts" and "%" as used in the following examples are always by weight where there are no statements to the contrary.

<Example 1>

After blending together a press cake of 3,3'-dichlorobenzidine hydrochloride in an amount corresponding to 150 parts of the 3,3'-dichlorobenzidine expressed by the following Formula (1):

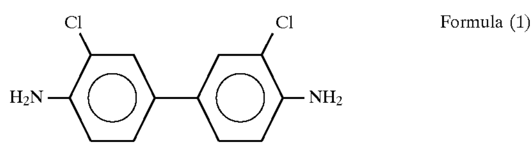

Formula (1)

with 186 parts of 35% hydrochloric acid, 1500 parts of water and 750 parts of ice, an aqueous solution of 86 parts of sodium nitrite was added under exposure to ice to obtain a tetrazo solution of 3,3'-dichlorobenzidine. 16.5 parts of the 2-acetoacetylamino benzoic acid expressed by the following Formula (2):

Formula (2)

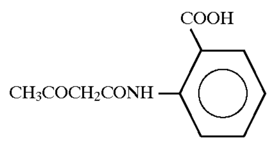

were added to this 3,3'-dichlorobenzidine tetrazo solution, then the result was mixed for three hours to obtain a reaction intermediate (A1).

Separately, after a press cake of 3,3'-dichlorobenzidine hydrochloride in an amount corresponding to 150 parts of the $3,3^1$-dichlorobenzidine expressed by following Formula (1) was blended with 186 parts of 35% hydrochloric acid, 1500 parts of water and 750 parts of ice, an aqueous solution of 86 parts of sodium nitrite was added under exposure to ice to obtain a tetrazo solution of 3,3'-dichlorobenzidine. 16.4 parts of the 4-acetoacetylamino acetoacetylamino benzamide expressed by the following Formula (3):

Formula (3)

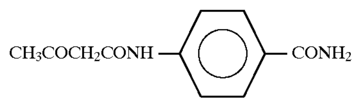

were added to this 3,3'-dichlorobenzidine tetrazo solution, then the result was mixed for three hours to obtain a reaction intermediate (B1).

Next, after blending together and dissolving 414.3 parts of the acetoacetanilide expressed by the following Formula (4):

Formula (P-1)

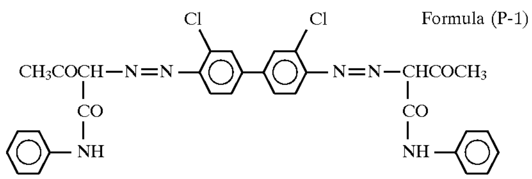

the disazo compound (corresponding to a compound expressed by Formula (I)) expressed by the following Formula (I-1):

Formula (I-1)

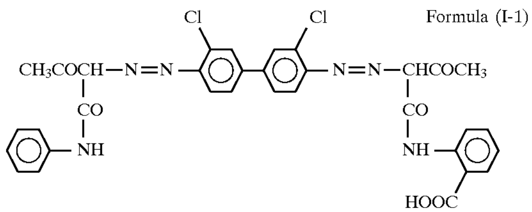

and the disazo compound (corresponding to a compound expressed by Formula (II)) expressed by the following Formula (II-1):

Formula (II-1)

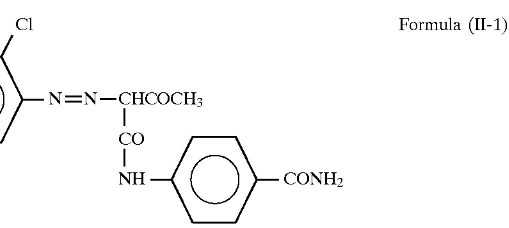

Formula (4)

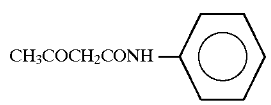

with 546.4 parts of a 25% sodium hydroxide solution and 7200 parts of water, diluted acetic acid comprising 228 parts of 90% acetic acid and 1000 parts of water were dripped therein over a period of one hour, upon which crystals precipitated to obtain reaction intermediate (C1).

Supply pumps were prepared so as to allow the reaction intermediate (A1) and the reaction intermediate (B1) to be dripped at a constant speed, and these were dripped into the reaction intermediate (C1) while regulating the fluid temperature to 5°–10° C. over a period of three hours to obtain a pigment slurry. After the dripping was completed, the result was mixed for one more hour and heated to 80° C. The reaction mixture was filtered and the filter cake was rinsed to obtain a pigment press cake of the disazo pigment composition of the present invention. Hereinbelow, this will be referred to as Example Press Cake 1.

After drying a portion of the Example Press Cake 1 and taking FD/MS measurements, peaks caused by molecular ions were present at m/z=628, m/z=672 and m/z=671, thus confirming that the Example Press Cake 1 contained the disazo pigment (C. I. pigment Y-12) expressed by the following Formula (P-1):

Additionally, the proportional content of the disazo compound expressed by Formula (I-1) and the disazo compound expressed by Formula (II-1) in the solid portion of the resulting disazo pigment composition were respectively 6% and 6%.

<Comparative Example 1>

After blending together a press cake of 3,3'-dichlorobenzidine hydrochloride in an amount corresponding to 300 parts of the 3,3'-dichlorobenzidine expressed by Formula (1) with 372 parts of 35% hydrochloric acid, 3000 parts of water and 1500 parts of ice, an aqueous solution of 172 parts of sodium nitrite was added under exposure to ice to obtain a tetrazo solution of 3,3'-dichlorobenzidine. 16.5 parts of the 2-acetoacetylamino benzoic acid expressed by Formula (2) were added to this 3,3'-dichlorobenzidine tetrazo solution, then the result was mixed for three hours to obtain a reaction intermediate (a1).

Next, after blending together and dissolving 427.5 parts of the acetoacetanilide expressed by Formula (4) with 546.4 parts of a 25% sodium hydroxide solution and 7200 parts of water, diluted acetic acid comprising 228 parts of 90% acetic acid and 1000 parts of water were dripped therein over a period of one hour, upon which crystals precipitated to obtain reaction intermediate (c1).

Supply pumps were prepared so as to allow the reaction intermediate (a1) to be dripped at a constant speed, and this was dripped into the reaction intermediate (c1) while regulating the fluid temperature to 5°–10° C. over a period of three hours to obtain a pigment slurry. After the dripping was completed, the result was mixed for one more hour and heated to 80° C. The reaction mixture was filtered and the filter cake was rinsed to obtain a pigment press cake containing the disazo pigment expressed by Formula (P-1) and the disazo compound expressed by Formula (I-1). The proportional content of the disazo compound expressed by Formula (I-1) in the solid portion of the resulting pigment press cake was 6%. Hereinbelow, this will be referred to as Comparative Example Press Cake 1

<Comparative Example 2>

After blending together a press cake of 3,3'-dichlorobenzidine hydrochloride in an amount corresponding to 300 parts of the 3,3,'-dichlorobenzidine expressed by Formula (1) with 372 parts of 35% hydrochloric acid, 3000 parts of water and 1500 parts of ice, an aqueous solution of 172 parts of sodium nitrite was added under exposure to ice to obtain a tetrazo solution of 3,3'-dichlorobenzidine. 16.4 parts of the 4-acetoacetylamino benzamide expressed by Formula (3) were added to this 3,3'-dichlorobenzidine tetrazo solution, then the result was mixed for three hours to obtain a reaction intermediate (b2).

Next, after blending together and dissolving 427.5 parts of the acetoacetanilide expressed by Formula (4) with 546.4 parts of a 25% sodium hydroxide solution and 7200 parts of water, diluted acetic acid comprising 228 parts of 90% acetic acid and 1000 parts of water were dripped therein over a period of one hour, upon which crystals precipitated to obtain reaction intermediate (c2).

Supply pumps were prepared so as to allow the reaction intermediate (b2) to be dripped at a constant speed, and this was dripped into the reaction intermediate (c2) while regulating the fluid temperature to 5°–10° C. over a period of three hours to obtain a pigment slurry. After the dripping was completed, the result was mixed for one more hour and heated to 80° C. The reaction mixture was filtered and the filter cake was rinsed to obtain a pigment press cake containing the disazo pigment expressed by Formula (P-1) and the disazo compound expressed by Formula (II-1). The proportional content of the disazo compound expressed by Formula (II-1) in the solid portion of the resulting pigment press cake was 6%. Hereinbelow, this will be referred to as Comparative Example Press Cake 2.

<Example 2>

Using the same procedure as in Example 1, with the exceptions that the 16.5 parts of the 2-acetoacetylamino benzoic acid expressed by Formula (2) were replaced by 35.4 parts of the 5-acetoacetylamino-2-hydroxy benzoic acid expressed by the following Formula (5):

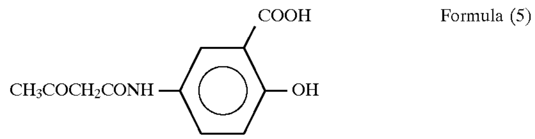

the amount of the 4-acetoacetylamino benzamide expressed by Formula (3) was increased from 16.4 parts to 43.8 parts and the amount of the acetoacetanilide expressed by Formula (4) was decreased from 414.3 parts to 379.1 parts, a pigment press cake of the disazo pigment composition according to the present invention was obtained. Hereinbelow, this will be referred to as Example Press Cake 2.

After drying a portion of the Example Press Cake 2 and taking FD/MS measurements, peaks caused by molecular ions were present at m/z=628, m/z=688 and m/z=671, thus confirming that the Example Press Cake 2 contained the disazo pigment (C. I. pigment Y-12) expressed by Formula (P-1), the disazo compound (corresponding to a compound expressed by Formula (I)) expressed by the following Formula (I-2):

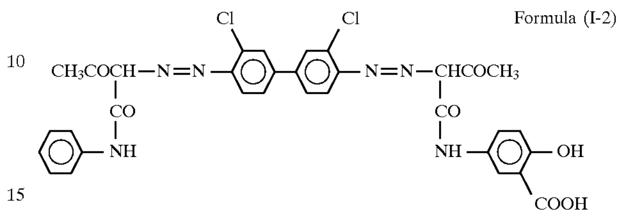

and the disazo compound (corresponding to a compound expressed by Formula (II)) expressed by Formula (II-1). Additionally, the proportional content of the disazo compound expressed by Formula (I-2) and the disazo compound expressed by Formula (II-1) in the solid portion of the resulting disazo pigment composition were respectively 13% and 17%.

<Comparative Example 3>

Using the same procedure as in Comparative Example 1, with the exceptions that the 16.5 parts of the 2-acetoacetylamino benzoic acid expressed by Formula (2) were replaced by 35.4 parts of the 5-acetoacetylamino-2-hydroxy benzoic acid expressed by Formula (5), and the amount of the acetoacetanilide was decreased from 427.5 parts to 414.3 parts, a pigment press cake containing the disazo pigment expressed by Formula (P-1) and the disazo compound expressed by Formula (I-2) was obtained. The proportional content of the disazo compound expressed by Formula (I-2) in the solid portion of the resulting pigment press cake was 13%. Hereinbelow, this will be referred to as Comparative Example Press Cake 3.

<Comparative Example 4>

Using the same procedure as in Comparative Example 2, with the exceptions that the amount of the 4-acetoacetylamino benzamide was increased from 16.4 parts to 43.8 parts, and the amount of the acetoacetanilide was decreased from 427.5 parts to 405.5 parts, a pigment press cake containing the disazo pigment expressed by Formula (P-1) and the disazo compound expressed by Formula (II-1) was obtained. The proportional content of the disazo compound expressed by Formula (II-1) in the solid portion of the resulting pigment press cake was 17%. Hereinbelow, this will be referred to as Comparative Example Press Cake 4.

<Example 3>

Using the same procedure as in Example 1, with the exceptions that the amount of the 2-acetoacetylamino benzoic acid expressed by Formula (2) was increased from 16.5 parts to 33 parts, the 16.4 parts of the 4-acetoacetylamino benzamide expressed by Formula (3) was replaced by 17.4 parts of the 5-acetoacetylamino benzimidazolone expressed by the following Formula (6):

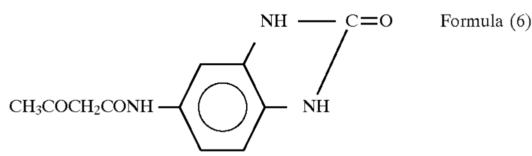

and the amount of the acetoacetanilide was decreased from 414.3 parts to 401.1 parts, a pigment press cake of the disazo pigment composition according to the present invention containing the disazo pigment (C. I. pigment Y-12) expressed by Formula (P-1), the disazo compound (corresponding to a compound expressed by Formula (I)) expressed by Formula (I-1), and the disazo compound (corresponding to a compound expressed by Formula (II)) expressed by Formula (II-2)

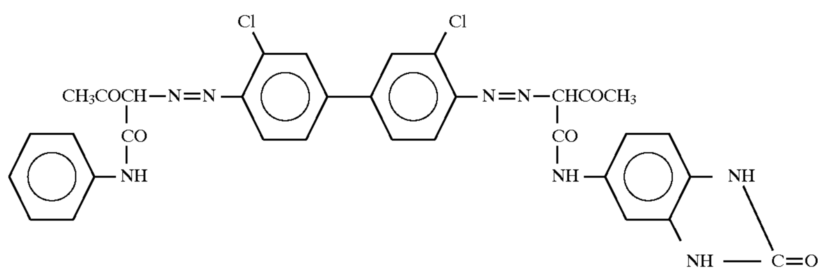

was obtained. The proportional content of the disazo compound expressed by Formula (I-1) and the disazo compound expressed by Formula (II-2) in the solid portion of the resulting disazo pigment composition were respectively 13% and 6%. Hereinbelow, this will be referred to as Example Press Cake 3.

<Comparative Example 5>

Using the same procedure as in Comparative Example 1, with the exceptions that the amount of the 2-acetoacetylamino benzoic acid expressed by Formula (2) was increased from 16.5 parts to 33 parts, and the amount of the acetoacetanilide expressed by Formula (4) was decreased from 427.5 parts to 414.3 parts, a pigment press cake containing the disazo pigment expressed by Formula (P-1) and the disazo compound expressed by Formula (I-1) was obtained. The proportional content of the disazo compound expressed by Formula (I-1) in the solid portion of the resulting pigment press cake was 13%. Hereinbelow, this will be referred to as Comparative Example Press Cake 5.

<Comparative Example 6>

Using the same procedure as in Comparative Example 2, with the exceptions that the 16.4 parts of the 4-acetoacetylamino benzamide expressed by Formula (3) was replaced by 17.4 parts of the 5-acetoacetylamino benzimidazolone expressed by Formula (6), a pigment press cake containing the disazo pigment expressed by Formula (P-1) and the disazo compound expressed by Formula (II-2) was obtained. The proportional content of the disazo compound expressed by Formula (II-2) in the solid portion of the resulting pigment press cake was 6%. Hereinbelow, this will be referred to as Comparative Example Press Cake 6.

<Example 4>

After stirring the pigment slurry obtained in Example 1 for one more hour, the result was regulated to a pH of 8 using a sodium hydroxide solution. Then, after adding a sodium solution of rosin (40 parts when converting for rosin), the mixture was heated to 80° C., and after heating for one hour at that temperature, 36 parts of aluminum sulfate were added. The reaction mixture was filtered and the filter cake was rinsed, upon which a pigment press cake of the disazo pigment composition according to the present invention containing the disazo pigment expressed by Formula (P-1), an aluminum salt of the disazo compound expressed by Formula (I-1), and the disazo compound expressed by Formula (II-1) was obtained. The proportional content of the aluminum salt of the disazo compound expressed by Formula (I-1) and the disazo compound expressed by Formula (II-1) in the solid portion of the resulting disazo pigment composition were respectively 6% and 6%. Hereinbelow, this will be referred to as Example Press Cake 4.

<Comparative Example 7>

After stirring the pigment slurry obtained in Comparative Example 1 for one more hour, the result was regulated to a pH of 8 using a sodium hydroxide solution. Then, after adding a sodium solution of rosin (40 parts when converting for rosin), the mixture was heated to 80° C., and after heating for one hour at that temperature, 36 parts of aluminum sulfate were added. The reaction mixture was filtered and the filter cake was rinsed, upon which a pigment press cake containing the disazo pigment expressed by Formula (P-1) and an aluminum salt of the disazo compound expressed by Formula (I-1) was obtained. The proportional content of the aluminum salt of the disazo compound expressed by Formula (I-1) in the solid portion of the resulting disazo pigment composition was 6%. Hereinbelow, this will be referred to as Comparative Example Press Cake 7.

<Comparative Example 8>

After stirring the pigment slurry obtained in Comparative Example 2 for one more hour, the result was regulated to a pH of 8 using a sodium hydroxide solution. Then, after adding a sodium solution of rosin (40 parts when converting for rosin), the mixture was heated to 80° C., and after heating for one hour at that temperature, 36 parts of aluminum sulfate were added. The reaction mixture was filtered and the filter cake was rinsed, upon which a pigment press cake containing the disazo pigment expressed by Formula (P-1) and the disazo compound expressed by Formula (II-1) was obtained. The proportional content of the disazo compound expressed by Formula (II-1) in the solid portion of the resulting disazo pigment composition was 6%. Hereinbelow, this will be referred to as Comparative Example Press Cake 8.

<Example 5>

Using the same procedure as in Example 1, with the exception that the 16.5 parts of the 2-acetoacetylamino benzoic acid expressed by Formula (2) were replaced by 22.1 parts of the 4-acetoacetylamino benzene sulfonic acid expressed by the following Formula (7):

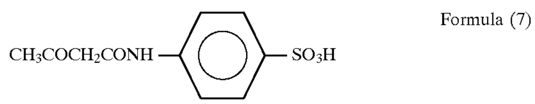

a pigment slurry containing the disazo pigment (C. I. pigment Y-12) expressed by Formula (P-1), the disazo compound (corresponding to a compound expressed by Formula (I)) expressed by the following Formula (I-3):

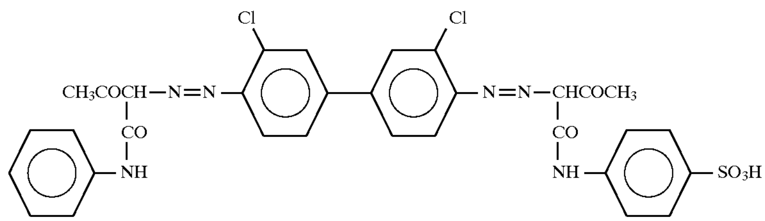

and the disazo compound (corresponding to a compound expressed by Formula (II)) expressed by Formula (II-1) was obtained.

After stirring this pigment slurry for one more hour, 20 parts of aluminum sulfate were added. This mixture was regulated to a pH of 5 using a sodium hydroxide solution, then heated to 80° C. The resulting reaction mixture was filtered and the filter cake was rinsed, upon which a pigment press cake of the disazo pigment composition according to the present invention was obtained. The proportional content of an aluminum salt of the disazo compound expressed by Formula (I-3) and the compound expressed by Formula (II-1) in the solid portion of the resulting disazo pigment composition were respectively 7% and 6%. Hereinbelow, this will be referred to as Example Press Cake 5.

<Comparative Example 9>

Using the same procedure as in Comparative Example 1, with the exception that the 16.5 parts of the 2-acetoacetylamino benzoic acid expressed by Formula (2) were replaced by 22.1 parts of the 4-acetoacetylamino benzene sulfonic acid expressed by Formula (7), a pigment slurry containing the disazo pigment expressed by Formula (P-1) and the disazo compound expressed by Formula (I-3) was obtained. The proportional content of the disazo compound expressed by Formula (I-3) in the solid portion of the resulting pigment slurry was 7%.

After stirring this pigment slurry for one more hour, 20 parts of aluminum sulfate were added. This mixture was regulated to a pH of 5 using a sodium hydroxide solution, then heated to 80° C. The resulting reaction mixture was filtered and the filter cake was rinsed to obtain a pigment press cake. Hereinbelow, this will be referred to as Comparative Example Press Cake 9.

<Comparative Example 10>

After stirring the pigment slurry obtained in Comparative Example 2 for one more hour, 20 parts of aluminum sulfate were added. This mixture was regulated to a pH of 5 using a sodium hydroxide solution, then heated to 80° C. The resulting reaction mixture was filtered and the filter cake was rinsed, upon which a pigment slurry containing the disazo pigment expressed by Formula (P-1) and the disazo compound expressed by Formula (II-1) were obtained. The proportional content of the compound expressed by Formula (II-1) in the solid portion of the resulting pigment slurry was 6%. Hereinbelow, this will be referred to as Comparative Example Press Cake 10.

<Example 6>

After blending together a press cake of 3,3'-dichlorobenzidine hydrochloride in an amount corresponding to 150 parts of the 3,3'-dichlorobenzidine expressed by Formula (1) with 186 parts of 35% hydrochloric acid, 1500 parts of water and 750 parts of ice, an aqueous solution of 86 parts of sodium nitrite was added under exposure to ice to obtain a tetrazo solution of 3,3'-dichlorobenzidine. 27.5 parts of the 2-acetoacetylamino benzoic acid expressed by Formula (2) were added to this 3,3'-dichlorobenzidine tetrazo solution, then the result was mixed for three hours to obtain a reaction intermediate (A6).

After mixing and dissolving 230 parts of the acetoacet-m-xylidide expressed by the following Formula (8):

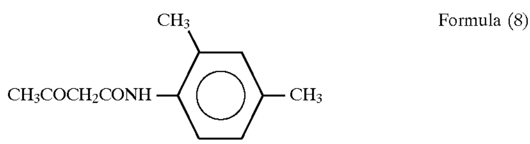

with 273.2 parts of a 25% sodium hydroxide solution and 3600 parts of water, diluted acetic acid comprising 114 parts of 90% acetic acid and 500 parts of water were dripped therein over a period of one hour, upon which crystals precipitated to obtain reaction intermediate (C61).

Supply pumps were prepared so as to allow the reaction intermediate (A6) to be dripped at a constant speed, and this was dripped into the reaction intermediate (C61) while regulating the fluid temperature to 5°–10° C. over a period of three hours. After the dripping was completed, the result was mixed for one more hour and heated to 80° C. The reaction mixture was filtered and the filter cake was rinsed and dried to obtain a powdered pigment (P1) containing 320 parts of the disazo pigment (C. I. pigment Y-13) expressed by the following Formula (P-2):

Formula (P-2)

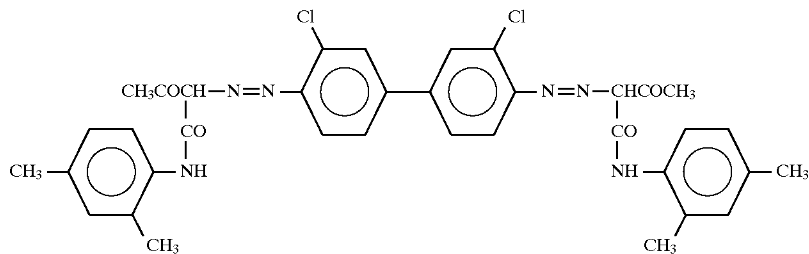

and 83 parts of the disazo compound (corresponding to a compound expressed by Formula (I)) expressed by the following Formula (I-4):

Formula (I-4)

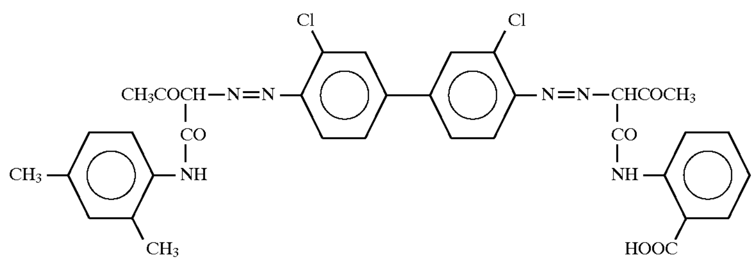

Separately, after blending a press cake of 3,3'-dichlorobenzidine hydrochloride in an amount corresponding to 150 parts of 3,3'-dichlorobenzidine with 186 parts of 35% hydrochloric acid, 1500 parts of water and 750 parts of ice, an aqueous solution of 86 parts of sodium nitrite was added under exposure to ice to obtain a tetrazo solution of 3,3'-dichlorobenzidine. 8.2 parts of the 4-acetoacetylamino benzamide expressed by Formula (3) were added to this 3,3'-dichlorobenzidine tetrazo solution, then the result was mixed for three hours to obtain a reaction intermediate (B6).

After mixing and dissolving 247.6 parts of the acetoacet-m-xylidide expressed by Formula (8) with 273.2 parts of a 25% sodium hydroxide solution and 3600 parts of water, diluted acetic acid comprising 114 parts of 90% acetic acid and 500 parts of water were dripped therein over a period of one hour, upon which crystals precipitated to obtain reaction intermediate (C62).

Supply pumps were prepared so as to allow the reaction intermediate (B6) to be dripped at a constant speed, and this was dripped into the reaction intermediate (C62) while regulating the fluid temperature to 5°–10° C. over a period of three hours. After the dripping was completed, the result was mixed for one more hour and heated to 80° C. The reaction mixture was filtered and the filter cake was rinsed and dried to obtain a powdered pigment (P2) containing 380 parts of the disazo pigment expressed by Formula (P-2) and 25 parts of the disazo compound (corresponding to a compound expressed by Formula (II)) expressed by the following Formula (II-3):

Formula (II-3)

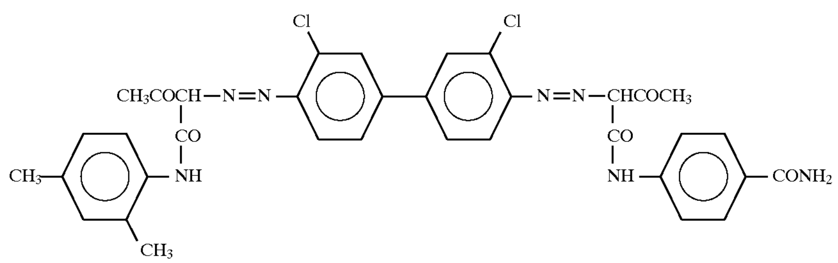

The powdered pigment (P1) and the powdered pigment (P2) were mixed to obtain a pigment powder of the disazo pigment composition according to the present invention. Hereinbelow, this will be referred to as Example Powder 6.

<Comparative Example 11>

After blending together a press cake of 3,3'-dichlorobenzidine hydrochloride in an amount corresponding to 150 parts of the 3,3'-dichlorobenzidine expressed by Formula (1) with 186 parts of 35% hydrochloric acid, 1500 parts of water and 750 parts of ice, an aqueous solution of 86 parts of sodium nitrite was added under exposure to ice to obtain a tetrazo solution of 3,3'-dichlorobenzidine. 27.5 parts of the 2-acetoacetylamino benzoic acid expressed by Formula (2) were added to this 3,3'-dichlorobenzidine tetrazo solution, then the result was mixed for three hours to obtain a reaction intermediate (a11).

After mixing and dissolving 230 parts of the acetoacet-m-xylidide expressed by Formula (8) with 273.2 parts of a 25% sodium hydroxide solution and 3600 parts of water, diluted acetic acid comprising 114 parts of 90% acetic acid and 500 parts of water were dripped therein over a period of one hour, upon which crystals precipitated to obtain reaction intermediate (c11).

Supply pumps were prepared so as to allow the reaction intermediate (a11) to be dripped at a constant speed, and this was dripped into the reaction intermediate (c11) while regulating the fluid temperature to 5°–10° C. over a period of three hours. After the dripping was completed, the result was mixed for one more hour and heated to 80° C. The reaction mixture was filtered and the filter cake was rinsed and dried to obtain a powdered pigment containing 320 parts of the disazo pigment expressed by Formula (P-2) and 83 parts of the disazo compound expressed by Formula (I-4). Hereinbelow, this will be referred to as Comparative Example Powder 11.

<Comparative Example 12>

After blending together a press cake of 3,3'-dichlorobenzidine hydrochloride in an amount corresponding to 150 parts of the 3,3'-dichlorobenzidine expressed by Formula (1) with 186 parts of 35% hydrochloric acid, 1500 parts of water and 750 parts of ice, an aqueous solution of 86 parts of sodium nitrite was added under exposure to ice to obtain a tetrazo solution of 3,3'-dichlorobenzidine. 8.2 parts of the 4-acetoacetylamino benzamide expressed by Formula (3) were added to this 3,3'-dichlorobenzidine tetrazo solution, then the result was mixed for three hours to obtain a reaction intermediate (b12).

After mixing and dissolving 247.6 parts of the acetoacet-m-xylidide expressed by Formula (8) with 273.2 parts of a 25% sodium hydroxide solution and 3600 parts of water, diluted acetic acid comprising 114 parts of 90% acetic acid and 500 parts of water were dripped therein over a period of one hour, upon which crystals precipitated to obtain reaction intermediate (c12).

Supply pumps were prepared so as to allow the reaction intermediate (b12) to be dripped at a constant speed, and this was dripped into the reaction intermediate (c12) while regulating the fluid temperature to 5°–10° C. over a period of three hours. After the dripping was completed, the result was mixed for one more hour and heated to 80° C. The reaction mixture was filtered and the filter cake was rinsed and dried to obtain a powdered pigment containing 380 parts of the disazo pigment expressed by Formula (P-2) and 25 parts of the disazo compound expressed by Formula (II-3). Hereinbelow, this will be referred to as Comparative Example Powder 12.

<Example 7>

Using the same procedure as in Example 6, with the exceptions that the 27.5 parts of the 2-acetoacetylamino benzoic acid expressed by Formula (2) were replaced by 31.8 parts of the 3-acetoacetylamino-4-chlorobenzoic acid expressed by the following Formula (9):

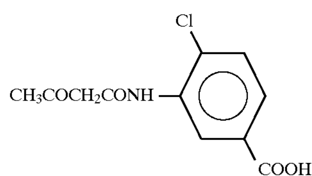

Formula (9)

the 230 parts of the acetoacet-m-xylidide were replaced by 232.5 parts of the acetoacet-o-anisidide expressed by the following Formula (10):

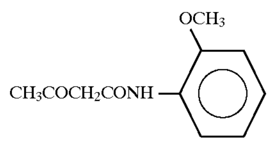

Formula (10)

the 8.2 parts of the 4-acetoacetylamino benzamide expressed by Formula (3) were replaced by 8.7 parts of the 4-acetoacetylamino acetanilide expressed by the following Formula (11):

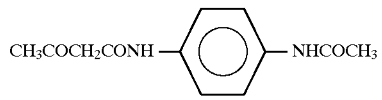

Formula (11)

and the 247.6 parts of the acetoacet-m-xylidide expressed by Formula (8) were replaced by 250.3 parts of the acetoacet-o-anisidide expressed by Formula (10), a pigment powder of the disazo pigment composition according to the present invention containing 705 parts of the disazo pigment (C. I. pigment Y-17) expressed by the following Formula (P-3):

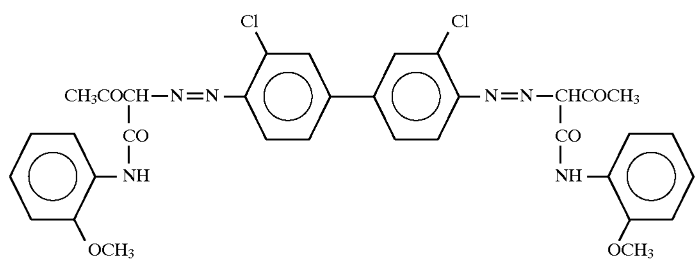

Formula (P-3)

91 parts of the disazo compound (corresponding to a compound expressed by Formula (I)) expressed by the following Formula (I-5):

Formula (I-5)

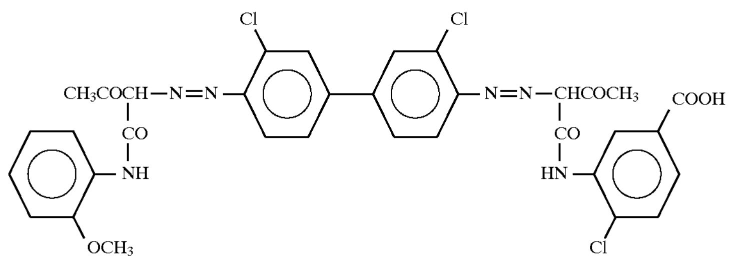

and 26 parts of the disazo compound (corresponding to a compound expressed by Formula (II)) expressed by the following Formula (II-5):

Formula (II-5)

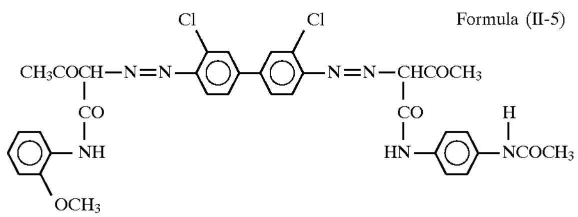

was obtained.

<Comparative Example 13>

Using the same procedure as in Comparative Example 11, with the exceptions that the 27.5 parts of the 2-acetoacetylamino benzoic acid expressed by Formula (2) were replaced by 31.8 parts of the 3-acetoacetylamino-4-chlorobenzoic acid expressed by Formula (9) and the 230 parts of the acetoacet-m-xylidide expressed by Formula (8) were replaced by 232.5 parts of the acetoacet-o-anisidide expressed by Formula (10), a powdered pigment containing 322 parts of the disazo pigment expressed by Formula (P-3) and 91 parts of the disazo compound expressed by Formula (I-5) was obtained. Hereinbelow, this will be referred to as Comparative Example Powder 13.

<Comparative Example 14>

Using the same procedure as in Comparative Example 12, with the exceptions that the 8.2 parts of the 4-acetoacetylamino benzamide expressed by Formula (3) were replaced by 8.7 parts of the 4-acetoacetylamino acetanilide expressed by Formula (11) and the 247.6 parts of the acetoacet-m-xylidide expressed by Formula (8) were replaced by 250.3 parts of the acetoacet-o-anisidide expressed by Formula (10), a powdered pigment containing 382 parts of the disazo pigment expressed by Formula (P-3) and 26 parts of the disazo compound expressed by Formula (II-5) was obtained. Hereinbelow, this will be referred to as Comparative Example Powder 14.

<Test Example 1>

Using the following procedures, the pigment press cakes obtained in Examples 1–5 and Comparative Examples 1–10 were formed into inks.

After adding 300 parts of a lithographic ink varnish (a varnish containing rosin phenolic resin manufactured by Dainippon Ink and Chemical) to a flusher heated to 60° C., a pigment press cake was added in an amount corresponding to 100 parts when converting for the solid portion of the pigment, and the result was flushed while kneading for 30 minutes. After decanting the free water, the flusher temperature was raised to 80° C. while vacuum dehydrating in order to remove the water content. After confirming that the water content had been removed, 170 parts of the lithographic ink varnish (a varnish containing rosin phenolic resin manufactured by Dainippon Ink and Chemical) and 30 parts of light oil were gradually added to obtain a test ink.

The flow ability and laray viscosity of the test inks prepared by the above procedures were measured, and the results are shown in Table 1.

With regard to the numerical values for the flow ability, higher values indicate that the lithographic ink has higher flow ability. With regard to the numerical values for the laray viscosity, higher values indicate that the lithographic ink has higher viscosity.

It should be noted that the flow ability was evaluated by kneading 1 g of printing ink for 1 minute using a spatula, putting the printing ink on the higher end of a glass plate which is placed with an inclination angle of 70°, waiting for 60 minutes, and measuring the length of the printing ink which has run toward a lower position (the length of the printing ink from the highest end to the lowest end).

TABLE 1

| PIGMENT PRESS CAKE USED | FLOW ABILITY (mm) | LARAY VISCOSITY (poise) |
|---|---|---|
| Example 1 | 183 | 520 |
| Comparative Example 1 | 188 | 215 |
| Comparative Example 2 | 123 | 415 |
| Example 2 | 218 | 615 |
| Comparative Example 3 | 232 | 320 |
| Comparative Example 4 | 108 | 540 |
| Example 3 | 232 | 485 |
| Comparative Example 5 | 240 | 230 |
| Comparative Example 6 | 112 | 445 |
| Example 4 | 163 | 620 |
| Comparative Example 7 | 171 | 290 |
| Comparative Example 8 | 109 | 505 |
| Example 5 | 152 | 485 |
| Comparative Example 9 | 160 | 190 |
| Comparative Example 10 | 115 | 430 |

The results shown in Table 1 demonstrate that the lithographic inks which use the disazo pigment compositions of the present invention obtained in Examples 1–5 have both high flow ability and high viscosity. On the other hand, the conventional disazo pigments obtained in Comparative Examples 1–10 form lithographic inks either having high flow ability but low viscosity or having high viscosity but low flow ability, and they do not have both high flow ability and high viscosity.

<Test Example 2>

Using the following procedures, the pigment powders obtained in Examples 6–7 and Comparative Examples 11–14 were formed into inks.

Specifically, 300 parts of a lithographic ink varnish heated to 40° C. and 100 parts of a pigment powder were put into a stainless steel vessel, then mixed with a lab mixer to prepare a mill base. This mill base was milled by using a triple roll mill to prepare a base ink. In the triple roll mill, 170 parts of the lithographic ink varnish and 30 parts of light oil were gradually added to the base ink to prepare a test ink.

The flow ability and laray viscosity of the test inks prepared by the above procedures were measured, and the results are shown in Table 2.

TABLE 2

| PIGMENT POWDER USED | FLOW ABILITY (mm) | LARAY VISCOSITY (poise) |
|---|---|---|
| Example 6 | 223 | 515 |
| Comparative Example 11 | 207 | 240 |
| Comparative Example 12 | 128 | 470 |
| Example 7 | 164 | 560 |
| Comparative Example 13 | 151 | 275 |
| Comparative Example 14 | 108 | 540 |

The results shown in Table 2 demonstrate that the lithographic inks which use the disazo pigment compositions of the present invention obtained in Examples 6–7 have both high flow ability and high viscosity. On the other hand, the conventional disazo pigments obtained in Comparative Examples 11–14 form lithographic inks either having high flow ability but low viscosity or having high viscosity but low flow ability, and they do not have both high flow ability and high viscosity.

What is claimed is:

1. A disazo pigment composition containing:

(a) a disazo pigment;

(b) a disazo compound expressed by the following Formula (I):

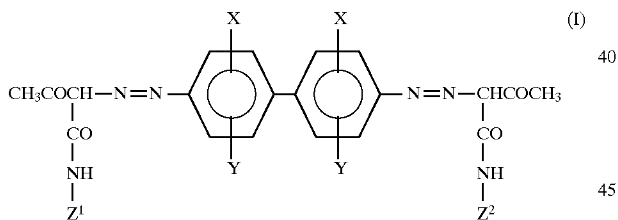

wherein X and Y each independently denote a hydrogen atom, a halogen atom, an alkyl group with 1–4 carbon atoms, an alkoxyl group with 1–4 carbon atoms or an alkoxycarbonyl group having an alkoxyl group with 1–4 carbon atoms, provided that X and Y never simultaneously denote hydrogen atoms, $Z^1$ denotes a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups, and $Z^2$ denotes a phenyl group or naphthyl group which may have 1–4 identical or different substituent groups selected from the group consisting of lower alkyl groups, lower alkoxyl groups, halogen atoms, hydroxyl groups and lower alkoxycarbonyl groups, and having a carboxylic acid group and/or a sulfonic acid group which may be a salt of a metal of at least one type selected from the group consisting of alkali earth metals, aluminum, magnesium and zinc; and (c) a disazo compound expressed by the following Formula (II):

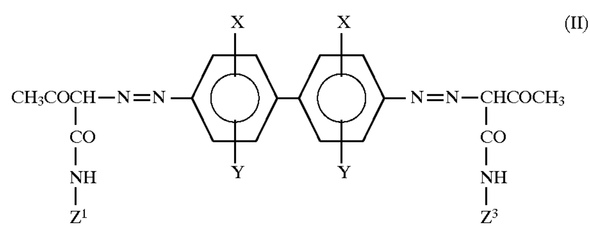

wherein X and Y each independently denote a hydrogen atom, a halogen atom, an alkyl group with 1–4 carbon atoms, an alkoxyl group with 1–4 carbon atoms or an alkoxycarbonyl group having an alkoxyl group with 1–4 carbon atoms, provided that X and Y never simultaneously denote hydrogen atoms, $Z^1$ denotes a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups, and $Z^3$ denotes a benzimidazolone residue, a phthalimide residue, or a phenyl group or naphthyl group which may have 1–4 identical or different substituent groups selected from the group consisting of lower alkyl groups, lower alkoxyl groups, halogen atoms, hydroxyl groups and lower alkoxycarbonyl, and having 1–4 substituent groups selected from the group consisting of carboxylic amide groups, sulfonic amide groups and acetamido groups.

2. A disazo pigment composition in accordance with claim 1, wherein in Formula (I), X and Y each independently denote a hydrogen atom, a halogen atom, an alkyl group with 1–4 carbon atoms, an alkoxyl group with 1–4 carbon atoms or an alkoxycarbonyl group having an alkoxyl group with 1–4 carbon atoms, provided that X and Y never simultaneously denote hydrogen atoms, $Z^1$ denotes a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups, and $Z^2$ denotes a phenyl group or naphthyl group which may have 1–4 identical or different substituent groups selected from the group consisting of lower alkyl groups, lower alkoxyl groups, halogen atoms, hydroxyl groups and lower alkoxycarbonyl groups, and having 1–4 carboxylic acid groups and/or sulfonic acid groups; and in Formula (II), X and Y each independently denote a hydrogen atom, a halogen atom, an alkyl group with 1–4 carbon atoms, an alkoxyl group with 1–4 carbon atoms or an alkoxycarbonyl group having an alkoxyl group with 1–4 carbon atoms, provided that X and Y never simultaneously denote hydrogen atoms, $Z^1$ denotes a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups, and $Z^3$ denotes a phenyl group or naphthyl group which may have 1–4 identical or different substituent groups selected from the group consisting of lower alkyl groups, lower alkoxyl groups, halogen atoms, hydroxyl groups and lower alkoxycarbonyl, and having 1–4 substituent groups selected from the group consisting of carboxylic amide groups, sulfonic amide groups and acetamido groups.

3. A disazo pigment composition in accordance with claim 1, wherein in Formula (I) and Formula (II), X and Y are each independently a hydrogen atom or a chlorine atom, provided that X and Y are never simultaneously hydrogen atoms, $Z^1$ is a phenyl group which may have 1–2 methyl groups or methoxy groups, $Z^2$ is a phenyl group which may have a hydroxyl group or a chlorine atom and having a carboxylic acid group or a sulfonic acid group which may be an aluminum salt, and $Z^3$ is a benzimidazolone residue, or a phenyl group having a carbamoyl group, an acetamido group or a sulfamoyl group.

4. A disazo pigment composition in accordance with claim 1, wherein in Formula (I) and Formula (II), X and Y are each independently a hydrogen atom or a chlorine atom, provided that X and Y are never simultaneously hydrogen atoms, $Z^1$ is a phenyl group which may have 1–2 methyl groups or methoxy groups, $Z^2$ is a phenyl group which may have a hydroxyl group and having a carboxylic acid group which may be an aluminum salt, and $Z^3$ is a phenyl group having a carbamoyl group, or an acetamido group.

5. A disazo pigment composition in accordance with one of claims 1–4, wherein the proportional content of the disazo compound expressed by Formula (I) in the solid portion of said disazo pigment composition is within the range of 1% to 20% by weight, and the proportional content of the disazo compound expressed by Formula (II) in the solid portion of said disazo pigment composition is within the range of 1% to 20% by weight.

6. A disazo pigment composition in accordance with one of claims 1–4, wherein the total proportional content of the disazo compound expressed by Formula (I) and the disazo compound expressed by Formula (II) in the solid portion of said disazo pigment composition is within the range of 4% to 35% by weight, and their weight ratio (I)/(II) is within the range of 30/70 to 75/25.

7. A disazo pigment composition in accordance with one of claims 1–4, wherein said disazo pigment is a disazo pigment expressed by the following Formula (VII):

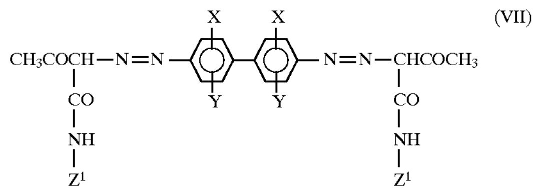

wherein X and Y each independently denote a hydrogen atom, a halogen atom, an alkyl group with 1–4 carbon atoms, an alkoxyl group with 1–4 carbon atoms or an alkoxycarbonyl group having an alkoxyl group with 1–4 carbon atoms, provided that X and Y never simultaneously denote hydrogen atoms, and $Z^1$ denotes a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups.

8. A disazo pigment composition in accordance with claim 7, wherein X, Y and $Z^1$ in Formula (I), Formula (II) and Formula (VII) are respectively identical.

9. A disazo pigment composition in accordance with one of claims 1–4, wherein said disazo pigment is at least one disazo pigment selected from the group consisting of pigments having C. I. pigment numbers Y-12, Y-13, Y-14, Y-17, Y-55, Y-57 and Y-81.

10. A disazo pigment composition in accordance with claim 6, wherein said disazo pigment is a disazo pigment expressed by the following Formula (VII):

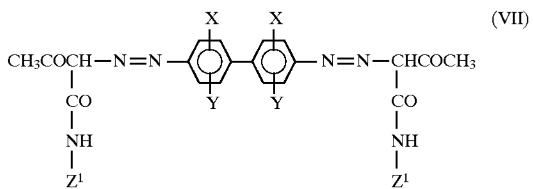

wherein X and Y each independently denote a hydrogen atom, a halogen atom, an alkyl group with 1–4 carbon atoms, an alkoxyl group with 1–4 carbon atoms or an alkoxycarbonyl group having an alkoxyl group with 1–4 carbon atoms, provided that X and Y never simultaneously denote hydrogen atoms, and $Z^1$ denotes a phenyl group or a naphthyl group which may have 1–4 identical or different substituent groups selected from the group consisting of lower alkyl groups, lower alkoxyl groups, halogen atoms, hydroxyl groups and lower alkoxycarbonyl groups.

11. A disazo pigment composition in accordance with claim 10, wherein X, Y and $Z^1$ in Formula (I), Formula (II) and Formula (VII) are respectively identical.

12. A disazo pigment composition in accordance with claim 6, wherein said disazo pigment is at least one disazo pigment selected from the group consisting of pigments having C. I. pigment numbers Y-12, Y-13, Y-14, Y-17, Y-55, Y-57 and Y-81.

13. A printing ink containing a disazo pigment composition in accordance with one of claims 1–4.

14. A printing ink containing a disazo pigment composition in accordance with claim 6.

15. A printing ink containing a disazo pigment composition in accordance with claim 8.

16. A printing ink containing a disazo pigment composition in accordance with claim 9.

* * * * *